(12) United States Patent
Yang et al.

(10) Patent No.: US 8,346,492 B2
(45) Date of Patent: Jan. 1, 2013

(54) INTEGRATED ACOUSTIC LEAK DETECTION SYSTEM USING INTRUSIVE AND NON-INTRUSIVE SENSORS

(75) Inventors: Bao-Wen Yang, Closter, NJ (US); Eric Yang, Closter, NJ (US); Marion Recane, Cypress, TX (US); Stephanie H. Yang, Closter, NJ (US)

(73) Assignees: Acoustic Systems, Inc., Houston, TX (US); Acoustic Systems, Inc., Nanuet, NY (US)

( * ) Notice: Subject to any disclaimer, the term of this patent is extended or adjusted under 35 U.S.C. 154(b) by 340 days.

(21) Appl. No.: 12/760,974

(22) Filed: Apr. 15, 2010

(65) Prior Publication Data

US 2011/0093220 A1    Apr. 21, 2011

Related U.S. Application Data

(60) Provisional application No. 61/253,693, filed on Oct. 21, 2009.

(51) Int. Cl.
   *G01M 3/24*   (2006.01)
(52) U.S. Cl. .............. 702/48; 702/51; 73/592; 73/579; 73/594; 73/40.5 A; 73/40.5 R
(58) Field of Classification Search .............. 702/48, 702/51; 73/592, 579, 594, 40.5 A, 40.5 R, 73/861.27, 584
   See application file for complete search history.

(56) References Cited

U.S. PATENT DOCUMENTS

| | | | | |
|---|---|---|---|---|
| 3,930,556 A * | 1/1976 | Kusuda et al. | ............. | 73/40.5 A |
| 4,375,763 A * | 3/1983 | Hogan | ......... | 73/40.5 R |
| 4,402,213 A * | 9/1983 | Hogan | ......... | 73/40.5 R |
| 4,581,727 A * | 4/1986 | Harper et al. | ................. | 367/118 |
| 5,038,614 A * | 8/1991 | Bseisu et al. | ..................... | 73/592 |
| 5,115,196 A * | 5/1992 | Low et al. | ..................... | 324/220 |
| 5,272,646 A * | 12/1993 | Farmer | .............. | 702/51 |
| 5,428,989 A * | 7/1995 | Jerde et al. | ................ | 73/40.5 R |
| 5,548,530 A * | 8/1996 | Baumoel | ......................... | 702/51 |
| 5,708,195 A * | 1/1998 | Kurisu et al. | ............. | 73/40.5 R |
| 5,940,290 A * | 8/1999 | Dixon | .............. | 700/9 |
| 5,987,990 A * | 11/1999 | Worthington et al. | .......... | 73/592 |
| 6,301,973 B1 * | 10/2001 | Smith | ..................... | 73/861.357 |
| 6,389,881 B1 | 5/2002 | Yang et al. | | |
| 6,668,619 B2 * | 12/2003 | Yang et al. | ................ | 73/40.5 R |
| 6,834,556 B2 * | 12/2004 | Cain et al. | .................. | 73/861.24 |
| 7,548,319 B2 * | 6/2009 | Hartog | .......................... | 356/478 |
| 2002/0124633 A1 * | 9/2002 | Yang et al. | ..................... | 73/40.5 |
| 2003/0079553 A1 * | 5/2003 | Cain et al. | .................. | 73/861.27 |
| 2010/0268489 A1 * | 10/2010 | Lie et al. | ........................ | 702/51 |
| 2010/0312502 A1 * | 12/2010 | Alonso | ........................... | 702/51 |
| 2012/0067126 A1 * | 3/2012 | Hartog et al. | ................... | 73/584 |

\* cited by examiner

*Primary Examiner* — Carol Tsai
(74) *Attorney, Agent, or Firm* — Egbert Law Offices, PLLC

(57) ABSTRACT

A system for detecting and locating leaks includes a pipeline, strain sensors positioned on the external surface of the pipeline, acoustic pressure sensors positioned at intervals along the pipeline, local processors connected to the strain sensors and acoustic pressure sensors, and a central processor connected to the local processors. The strain sensors measure a strain on the external surface of the pipeline indicative of changes in the pressure of the fluid within the pipeline. The acoustic pressure sensors sense acoustic signals within the pipline. Sensed acoustic pressure signals and sensed strain measurements are compared to each other and to stored profiles to detect and locate leaks.

18 Claims, 5 Drawing Sheets

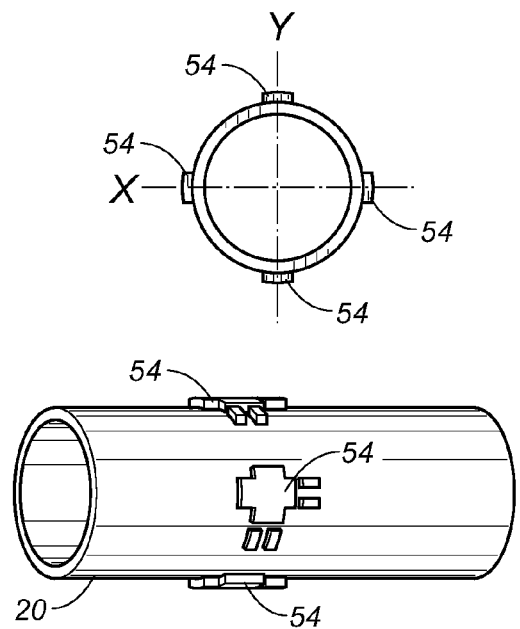
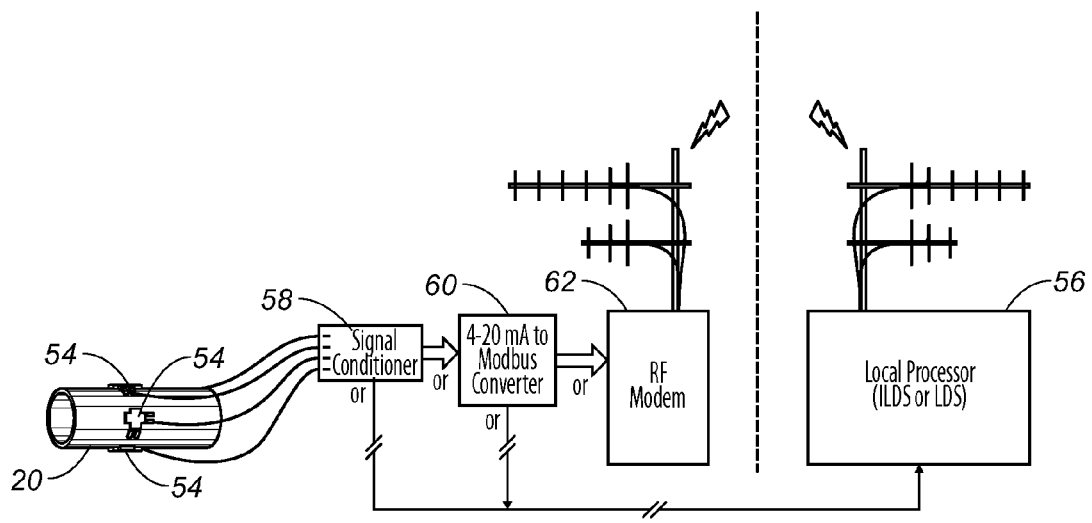
FIG. 5
FIG. 6

INTEGRATED ACOUSTIC LEAK DETECTION SYSTEM USING INTRUSIVE AND NON-INTRUSIVE SENSORS

RELATED U.S. APPLICATIONS

The present application claims priority from prior-filed U.S. Provisional Patent Application Ser. No. 61/253,693, filed on Oct. 21, 2009

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of leak detection in pipelines. More particularly, the present invention relates to a method and system for integrated acoustic leak detection. Even more particularly, the present invention relates to an improved method and apparatus for quick, sensitive, and accurate detection and location of the source of a leak in a pipeline utilizing the combination of easily installed non-intrusive sensors and the highly sensitive and reliable acoustic sensors leak detection techniques.

2. Description of Related Art Including Information Disclosed Under 37 CFR 1.97 and 37 CFR 1.98.

In pressurized systems, such as pipelines, the pressure boundary is maintained by the pipe wall. The pipe wall has a yield stress greater than the stress exerted from the system pressure. At the instant of a breakdown of the pressure boundary of the pipe wall, the release of the elastic force couples with the system fluid to create a transient pressure wave. Since pressure is relieved (due to the break in the pipe wall) from the containment system, the transient pressure wave takes the form of an expansion wave. This expansion waves travel outward in all directions from the source at the speed of sound for that fluid. When the fluid is contained in a pipeline, the expansion waves are guided through the fluid by the walls of the pipe in either direction from the source of the break.

Real time acoustic pipeline leak detection requires placing permanent monitors on a pipeline for detecting expansion pressure waves associated with a sudden break down of the pressure boundary. In the past, it was the pattern and amplitude of the signal that were of concern. The source of the pressure waves was located between monitors by recording the times when the expansion pressure wave arrived at least two different monitors. Using these times ($t_2$ and $t_1$), knowing the fluid sound velocity (V) and the length of pipe between monitors (D) the leak event could be located. As shown in the following equation where X is the leak event location (distance from sensor number 1).

If this event was not located between the monitors, it was ignored as a false event coming from outside of the protected zone. Previously, background noises were filtered out by various techniques such as moving average, repetitive filter, dynamic threshold and band pass filters. Although, these have successfully filtered out certain types of background noises, these techniques have little affect on other types of transient noises, such as noises from pumps, compressors, and valve operations. These transient noises oftentimes produced signals with patterns and amplitudes similar to the patterns and amplitudes of such signals produced by leaks. This has led to a high false alarm rate and reduced sensitivity.

Various patents have issued in the past relating to leak detection in pipelines. One of the present inventors is an inventor on several patents in the field. For example, U.S. Pat. No. 6,389,881 issued on May 21, 2002 to Yang, et al. describes a method and apparatus for pattern match filtering for real time acoustic pipeline leak detection and location. The patent describes how pattern match filtering is used to reduce false alarm rate, increase sensitivity and improve leak location accuracy, while quickly detecting leaks by the acoustic signal generated from a leak event in pipelines containing gas or liquid under pressure. The pattern match filter technique detects a pressure wave generated by a leak, but discriminates against background noise and pressure disturbance generated by other non-leak sources that might otherwise be detected as a leak. The pattern match filter derives a sharp peaked output from the signal of the expansion wave which allows for a distinctive point of reference for a time stamp. This provides for improved accuracy in leak location calculations. The pattern match filter is incorporated into site processors located at multiple points along a pipeline, and at a central node processor which receives data from all site processors. The pattern match filter includes using previously recorded leak profiles. At site processors located at multiple points along a pipeline, a series of previously recorded signature leak profiles are continuously compared in real time against pipeline pressure signals. Data from each site processor are used collectively at a node processor and compared against multiple leak profiles to provide further false alarm rejection. The leak event data generated at each site processor is used by the node processor to declare a leak. By the application of this pattern match filter technique, the signal to noise ratio (S/N ratio) required to identify a leak event is reduced and the sensitivity of leak detection is increased. U.S. Pat. No. 6,668,619 issued to Yang et al. on Dec. 30, 2003 describes a related method of pattern match filtering.

U.S. Pat. No. 6,301,973 issued on Oct. 16, 2001 to Smith and describes anon-intrusive pressure sensor and method. In the patent, non-intrusive pressure sensors for measuring unsteady pressures within a pipe include an optical fiber wrapped in coils around the circumference of the pipe. The length or change in length of the coils is indicative of the unsteady pressure in the pipe. Bragg gratings impressed in the fiber may be used having reflection wavelengths that relate to the unsteady pressure in the pipe. One or more sensors may be axially distributed along the fiber using wavelength division multiplexing and/or time division multiplexing.

A strain gauge is an instrument used to measure strain on structures subjected to the action of external forces. Strain is defined as the amount of deformation per unit length of an object when a load is applied. Strain is calculated by dividing the total deformation of the original length by the original length (L): Strain ($\epsilon$)=$\Delta L/L$. Typical values for strain are less than 0.005 inch/inch and are often expressed in micro-strain units: strain×$10^6$.

In particular, pipelines and vessels are subjected to various external forces that produce strain in different geometrical directions, e.g. longitudinal and hoop, to the pipeline or vessel wall. Such external forces are varied in nature and their presence and magnitude depend on the installation, environmental and operating conditions of such pipelines or vessels. Examples of these forces are soil in underground pipelines or liquid loads in underwater pipelines, fluid pressure, bending forces of any structure linked mechanically to the pipe or vessel, such as piping, mechanical supports and valves, as well as mechanical vibration and other transient mechanical forces.

When the pipeline or vessel wall suffers the prolonged action of such forces, various defects can occur in their material structure such as micro cracks, fissures and defects of the kind Eventually, these defects can lead to major cracks and full rupture.

In metals, more in particular in metallic pipelines and metallic vessels, such defects may be present in conjunction with internal and/or external corrosion and fatigue caused by operational conditions, meaning fluctuations in the operating pressure and temperature, ambient temperature changes, changes in mechanical load applied to the structure, such as the soil movements in underground pipelines and under water currents in sub-sea pipelines. The combined effect of corrosion and fatigue, among other deteriorating effects to pipelines and vessels not specifically mentioned but not excluded here, weaken the pipeline or vessel wall.

In particular, the operating pressure is manifested on the pipeline or vessel wall as a measurable strain on the pipeline or vessel wall, as axial and hoop strain. Axial and hoop strains exist simultaneously at each cross section of the pipe. The pipe wall stretches in the circumferential and axial directions the same amount at the same time.

Fluctuations in the operating pressure in pipelines and vessels occur due to various causes, including increase or decrease of demand in pipelines supplying fluid to customers, process disruptions from malfunctioning compressors or pumps or caused by operators, changes of process conditions, sudden expansion of compressible fluids, start and stop of pumps and compressors, opening of relief valves, action of pressure and flow control valves, and many other transient conditions produced by mechanical equipment mechanically linked to the pipeline or vessel, as well as transient events such as pipeline leaks. These pressure fluctuations produce pressure waves of various patterns that travel across the fluid as well as the pipeline and vessel wall. Such pressure waves manifest as a measurable strain reading on the pipeline or vessel wall.

In pipelines leak detection systems, the previous patented technique [Yang & Recane] for filtering undesirable signals, generally coming from external sources placed beyond pipeline limits or beyond the protected segments of the pipelines, such as pumps and compressors, was based on the detection of the transit direction of fluid waves by means of a dual intrusive sensor arrangement whereas each sensor probe is physically exposed to the pipeline fluid. The intrusive types of sensors, such as pressure and temperature sensors, are conveniently placed at the end of the pipeline. In this kind of solutions, the dual sensor arrangement is connected to a field processor capable of determining the difference in the arrival time of the fluid waves. With proper wavelength and sensor span, when accurately determined, the difference in the arrival time of such waves and its sign allows the processor to determine the transit direction of such wave.

The main limitation in the use of intrusive sensors on pre-existent pipeline facilities resides in the fact that the sensor needs to be in direct contact with the pipeline fluid and consequently expensive and risky hot-tapping techniques may be required when tapping points are not available. This limitation imposes a high total installation cost and risk in pipeline projects.

Various experiments have been conducted in order to determine the strain effects of pressure waves by measuring strain as a function of the maximum strain rate in a pipeline. It has been verified that strain waves also add and subtract to the maximum strain. The magnitude of the maximum strain varies as a function of strain wave effects. The variance in the measured maximum strain rate is attributed to the strain effect of pressure waves. This strain resulting from pressure waves traveling along a pipeline originates a resultant strain wave, which occur throughout the pipe length at a value proportional to the maximum strain.

In particular, one of the sources of pressure waves is a leak in a pipeline or vessel. Pipeline or vessel leaks produce negative pressure waves which travel in all directions across the fluid contained in the pipeline or vessel. These pressure waves attenuate as they move away from the leak-origin point. The attenuation may be significant at the high frequency wave components. The resulting strain wave measured on the pipeline or vessel wall correlates to the leak pressure wave. The correlation between pressure waves and strain waves on a pipeline can be observed in various experimental results.

However, in presence of vibration caused by fluid or external sources the leak-strain wave intensity in relation to the vibration signal intensity at a given point on the pipeline or vessel require specific leak pattern recognition techniques to be detected.

In process plants, piping and vessels are exposed to various sources of vibration as well as pipelines are exposed to fluid and mechanical vibration. Thus, the leak-correlated strain wave measured at different points of the pipeline or vessel wall provides an indication of the magnitude of the leak pressure wave. However, in order to estimate the measured strain into a meaningful fluid pressure measurement, a reference pressure point must be provided as well as temperature, fluid and pipeline or vessel wall material properties must be known. This is because the strain response of the pipeline or vessel wall material to the fluid pressure energy varies with the ambient temperature, fluid and material properties. An estimation of pressure wave as a function of the resulting strain on a structure requires a physical model that represents the acting physical variables of the phenomenon. If necessary, an on-site fine tuning can be performed with intrusive acoustic pressure sensors as well as non-intrusive sensors to correlate the patterns.

For further accuracy in the fluid pressure calculation as a function of measured strain, the physical model includes a thermal model that represents the thermal expansion of the materials, capable of inferring fluid temperature by taking into account the temperature of the medium surrounding to the pipeline or vessels, such as soil temperature, air ambient temperature or the surrounding liquid temperature in the case of submersed pipelines.

Most of the heat loss in a pipeline or vessel occurs in the heat conduction between the pipeline or vessel wall to the surrounding media. Assuming heat conduction is the primary heat transfer mechanism, the heat transfer between the pipeline or vessel wall to the surrounding media is estimated by the Fourier law as function of the temperature gradient between the temperature of the pipe wall and the surrounding media. For a subsea pipeline, heat transfer due to convective heat transfer might also have contribution to the temperature of the pipe wall. Another thermal phenomenon is the thermal expansion of the pipeline or vessel wall in presence of varying temperature conditions. The resultant temperature of the pipeline or vessel wall defines the effect on strain measured on the structure.

In addition to the presence of vibration, the measurement of strain waves on pipeline or vessel walls by means of electrical resistance strain gauges suffers problems of poor signal-to-noise ratio due to the electrical nature of the measurement, which can be affected by surrounding electrical currents or induced currents through electromagnetic sources, or resulting from capacitive or resistive coupling with other sources, such underground electrical power lines, current discharges to the ground grid (ground potential raise-GPR), and among other electrical-related phenomena including ambient conditions (lightening).

Traditional foil strain gauges do not have adequate signal-to-noise ratios at such small strains. Specially designed fiber-optic strain gauges, as well as special resistance-based strain gauges, have been shown to be potentially useful for measuring such small strains. There are various methods to measure strain on materials based on laser light propagating across a fiber optic attached to the structure on which strain wants to be measured. In presence of strain forces the light emerging from one end of the fiber forms a speckle pattern that changes as strain is applied to the structure. The speckle pattern is intercepted by an array of photocells, so that any change in the speckle pattern manifests itself in changes in the intensities of light measured by the individual photocells. The outputs of the photocells are collected by a customized expert based data-acquisition system that includes a uniquely configured signal-conditioning subsystem. The photocell outputs are then fed to a neural network or pattern recognition system similar to the one described in the previous patent [Yang et al.] that recognizes the correlation between changes in the outputs and changes in strain as a result of different transient events, such as leaks. Inasmuch as the changes in the intensities of light incident on the photocells are repeatable for a given amount of change in strain, the neural network can be quickly trained by use of speckle patterns associated with known patterns and profiles of strain. For measurement of temporally varying strain (for example, when vibrations are present), the update rate and, hence, the dynamic analysis rate depends on the data-acquisition rate.

It is an object of the present invention to provide an acoustic leak detection system that utilizes both intrusive and non-intrusive sensors.

It is another object of the present invention to provide an acoustic leak detection system that utilizes the measurement of strain on a pipeline or vessel to detect leaks.

It is another object of the present invention to provide an acoustic leak detection system and method that is relatively inexpensive to install and maintain.

It is another object of the present invention to provide a leak detection system and method that filters background noise.

It is another object of the present invention to utilize specially configured and trained neural networks or pattern recognition methods similar to the one described in the previous patent [Yang et al.] to identify the unique strain pattern as measured by various non-intrusive devices.

It is yet another object of the present invention to utilize the GPS time tagging approach based on leak event detecting times registered by either intrusive or non-intrusive sensors at two or more different locations along the pipeline to calculate the precise leak location based on time of flight relationship.

These and other objects and advantages of the present invention will become apparent from a reading of the attached specification.

BRIEF SUMMARY OF THE INVENTION

The present invention is a system used to detect and locate leaks on pipelines or vessels based on measurement of strain waves as well as acoustic pressure measurement. The system of the present invention utilizes both non-intrusive strain sensors and intrusive acoustic pressure sensors located along a pipeline. In the preferred embodiment of the present invention, the strain sensor includes a plurality of individual strain sensors positioned in an array around the circumference of a pipe wall or vessel wall. In the preferred embodiment of the present invention, the strain sensors can be specially configured fiber optic strain sensors, resistance based strain gauges, or other types of non-intrusive sensors. One example of the embodiment of the present invention, separate pairs of non-intrusive strain sensors are positioned at upstream and downstream positions along the pipeline. Each of these pairs of sensors is connected to a local processor. Also connected to the local processors is the intrusive acoustic pressure sensor. Each of the local processors is connected to a central processor.

In an alternative embodiment of the present invention, a single non-intrusive sensor may be substituted for one of the pairs of non-intrusive sensors. In this embodiment, the signals received by the single non-intrusive sensor are compared to an intrusive acoustic pressure sensor located an optimal distance from the non-intrusive sensor, either upstream or downstream from the non-intrusive sensor.

In another alternative embodiment of the present invention, single non-intrusive sensors are substituted for each of the pairs of non-intrusive sensors. In this embodiment, the signals received by each of the single non-intrusive sensors are compared to respective intrusive acoustic pressure sensors located optimal distances from the non-intrusive sensors, either upstream or downstream from the non-intrusive sensors.

In the present invention, as an example, the non-intrusive sensors may be connected to the local processor through a signal conditioner. In addition, the signal conditioner may be connected to the local processor through a signal converter and RF modem. The RF modem is connected to the local processor using UHF antennae. Other forms of connections can also be applied for this connection.

BRIEF DESCRIPTION OF THE SEVERAL VIEWS OF THE DRAWINGS

FIG. 5 shows side and frontal views of a pipeline having an array of non-intrusive sensors installed thereon.

FIG. 6 is a schematic view showing the possible connection of the non-intrusive sensors to the local processor.

DETAILED DESCRIPTION OF THE INVENTION

Figure 1:
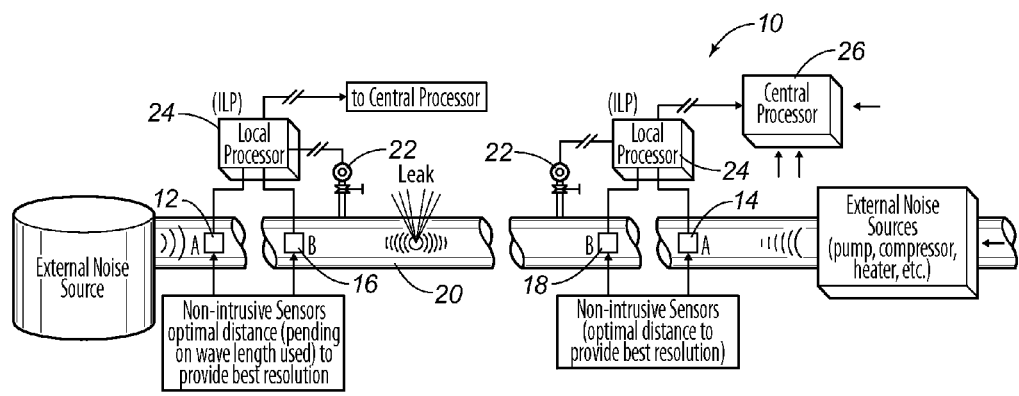
FIG. 1 is a schematic view showing the preferred embodiment of the system of the present invention.

Standard acoustic sensors must be in contact with the pipeline fluid to "hear" the leak signal. However, in some installations it is not possible to install these types of sensors since they require direct fluid contact which involves drilling of a hole in the pipe wall for installation. Even where this is possible, a "hot tap" of a pipeline or vessel can be expensive and dangerous.

With the recent development on non-intrusive sensors, including resistivity strain gauge, fiber optic and piezoelectric strain gauges, it is possible to measure the strain on the pipe wall resulting from the pressure oscillation and relate it to the acoustic pressure wave signal produced by a leak. These types of non-intrusive sensors (such as fiber optic sensors and resistance based sensors) can be installed directly to the outer wall of the pipeline and are non-intrusive.

Although the standard acoustic sensor has better resolution and better frequency response as well as less energy or signal loss due to pipe wall dampening, which results in better signals for leak information, an alternative approach with the advantages of easy and low cost installation is by using fiber optic sensors or other types of non-intrusive sensors to lower the cost of installation by minimizing the number of hot taps and drilling requirements. Directional filtering is used to discriminate the direction from which a signal is traveling in the pipeline. This can be done by installing the fiber optic sensor or other type of non-intrusive sensor at a span sufficient for the dominant wavelength to provide adequate resolution and then comparing the time of arrival and magnitude of hte signals of the acoustic pressure signals produced by each device. Since these pairs of sensors are typically installed at the ends of the monitored sections of a pipeline, knowing which direction a signal is traveling from is of great value in discriminating against false alarms generated from sources outside the protected span.

Various strain gauges can be used as non-intrusive pressure sensors as applied to pipeline leak detection. Fiber optic sensors or other suitable non-intrusive sensors are ideal for operation in flammable environments or in close proximity to electrical equipment because they are passive, non-electrical and immune to electromagnetic interference (EMI). They operate continuously at temperatures as high as 300° C. and because of their flexibility, are easily bonded to structures of complex curvature. With recent development for carbon steel pipelines with diameters of 12 inches or greater, the fiber optic sensor can detect pressure with resolution of 0.5 psi or better. With millisecond or higher sampling rates, acoustic pressure wave signals can be gathered, filtered, and processed for leak information.

Resistance based metallic strip strain gauges may also be used. In this application, a Wheatstone bridge arrangement is used to measure the resistance of the metal gauge, which varies as the metal gauge is distorted by the strain applied.

Piezoelectric strain gauges are another option. In this application, strain is measured in terms of the charge generated by the element as a result of the direct piezoelectric effect. Strain can be measured from piezoceramic (PZT) and piezofilm (PVDF). The sensors can be surface bonded to a beam and can be calibrated over wide range of frequency. Correction factors to account for transverse strain and shear lag effects due to the bond layer are analytically derived and experimentally validated. The effect of temperature on the output of PZT strain sensors can be compensated. The primary problem with using a piezoelectric material is that since measurement circuitry has limited impedance, the charge generated from the mechanical strain will gradually leak through the measurement impedance. A piezoelectric material is generally used for dynamic signals/burst detections and it cannot provide reliable steady-state signal measurement.

Capacitive strain gauges may also be used. In this application, the capacitive strain sensor employs a novel mechanical amplifier using buckled beam suspensions to mechanically amplify the applied displacement signal, thus resulting in a 20 dB increment of the differential capacitance output. Therefore, the sensor can be operated in ambient without requiring a vacuum packaging, thus substantially reducing the system packaging complexity and cost. A key factor to achieve high measurement consistency is to select a capacitive strain gauge sensors with transmission ratios less sensitive to bonding adhesive thickness. Recent reports indicated that the overall capacitive strain sensor module has a sensor dimension of 2 mm×3 mm and delivers a nominal capacitance of 0.23 pF, and a measured capacitance output sensitivity of 280 pF/microstrain. Integrated with low-noise CN converter interface electronics, the overall system is able to detect a minimum strain of 0.033 micro-strain with the maximum range of 1000 micro-strain, indicating an equivalent dynamic range of 89 dB has been achieved.

Magnetic stain gauges are yet another option. In this application, a change in the magnetic properties of the material used in the strain gauge can be correlated to the strain in the part. The strain gauge is comprised of a magnetic multilayer assembly exhibiting the spin valve effect with individual ferromagnetic layers possessing magnetostrictive properties. A magnetic field source is used to bias the magnetic moments of the ferromagnetic layers in a given direction whereby stress applied causes previously antiferromagnetically coupled moments to be angularly realigned toward a ferromagnetic arrangement. Such realignment causes a corresponding resistance change of unexpectedly high magnitude thereby providing a highly sensitive strain gauge.

Resonant strain gauges may also be used. The resonant strain gauge provides a frequency-based form of measurement that is less susceptible to noise. The resonant strain gauge is a beam that is suspended slightly above the strain member and attached to it a both ends. The strain gauge beam is magnetically excited with pulses and the frequency of vibration is detected by a magnetic detection circuit. As the beam is stretched by mechanical strain, the frequency of vibration increases. These sensors provide higher resolution than typical piezoresistive sensors and have a lower temperature coefficient. The resonant sensor, however, require a complex three-dimensional fabrication technique, unlike the typical piezoresistors which require only planar techniques.

Piezoresistive strain gauges (semiconductor strain gauges or solid state strain gauges) are also an option. In these gauges, the primary means of measuring strain with a microsensor is via piezoresistive strain gauges, which is an analog form of measurement. Piezoresistive strain gauges, also know as semiconductor gauges, change resistance in response to a mechanical strain. The change in resistance of a piezoresistive material is stable and easily measurable for steady-state signals. One problem with piezoresistive material is that they exhibit strong strain-temperature dependence and so must typically be thermally compensated. Principle action of solid state, piezoresistive strain gauge transducers consists of a Wheatstone bridge configuration with excitation by regulated power supply followed by stable, fixed gain amplification.

As pressure is applied to the strain gauge, the wires increase in length and decrease in diameter, increasing the resistance to flow of current through the wires of the Wheatstone Bridge. This change in the wires' electrical resistance causes a voltage change that can be quantified to reflect the amount of pressure that changed the wires length and diameter. The electrical signal can be amplified and measured. When calibrated, the electrical signal is proportional to the pressure change Various configurations of the integrated leak detection system are contemplated for high performance, on-line real-time leak detection. Depending on available resources and field limitations, various configurations of the system can be used to integrate the acoustic sensors with fiber optic or other non-intrusive sensors. The module-based acoustic leak detection system with its local processing capability can be used to perform on-line real-time data processing to execute the directional filtering function and provide powerful and effective filtering results to eliminate acoustic noised generated from non-related segments of the pipelines. This type of directional filtering is especially useful against noise generated from common noise sources, such as pumps, compressors, active operating valves, heat exchangers, metering stations, cyclones and other types of filters, pressure reducers or other regulators, and power plants. Depending on the budget limitations, the availability of space for sensor installation, the requirement of leak detection performance in term of sensitivity and reliability (false alarm rate), various configurations of the system can be utilized. Various configurations are shown in the following figures.

Referring to FIG. 1, one configuration of the system 10 of the present invention is shown. Each of the non-intrusive sensors shown in FIG. 1 and subsequent figures represents an array of sensors installed in spaced relation around the circumference of the pipeline 20 or vessel. Preferably, the individual sensors are installed at the 3, 6, 9 and 12 o'clock positions around the pipeline wall.

In this configuration, there are two separate pairs of non-intrusive sensors used to gather acoustic pressure wave information through the exterior surface of the pipe wall to provide independent directional filtering function at both ends of the pipelines or any branch locations. The first sensor pair consists of sensors 12 and 16. The second sensor pair consists of sensors 14 and 18. In this configuration, within each non-intrusive sensor pair, the signals gathered from one sensor are used to compare against the signals gathered at the other sensor with a certain time delay determined from the traveling time of signals traveling though the span between these two sensors. For example, signals gathered at sensor 12 at time t (PAt) is used to compare against signals gathered at sensor 16 at time t+$\Delta$t (PBt+$\Delta$t) where $\Delta$t is the delay time or traveling time of the interesting acoustic signals traveling from sensor 12 to sensor 16 and vice versa. Similarly, signals gathered at sensor 14 are used to compare with signals gathered at sensor 18. The detailed algorithm and method for directional filtering using acoustic sensors described in the inventor's previous patents can be used for this application. Also shown in FIG. 1 are the intrusive acoustic pressure sensors 22 and local processors 24. The various sensors are connected to local processors 24, which are connected to the central processor 26.

Figure 2A:
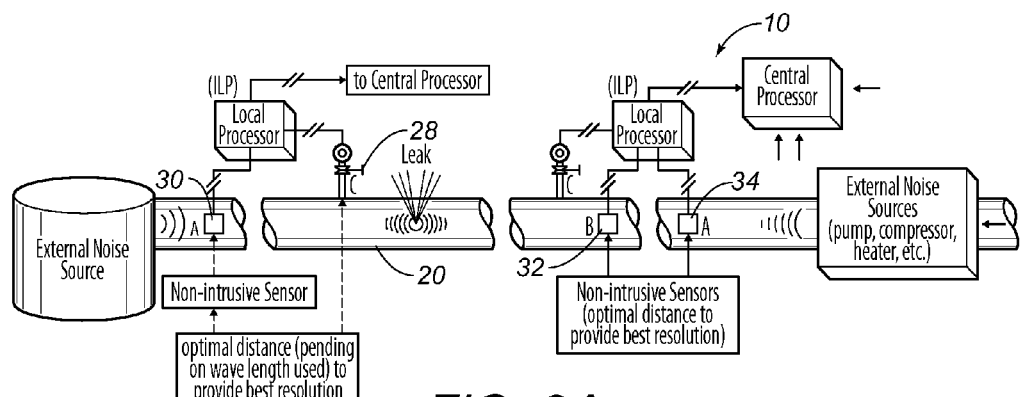
FIG. 2A is a schematic view showing an alternative embodiment of the system of the present invention wherein a single non-intrusive sensor is substituted for one of the pairs of non-intrusive sensors.
Figure 2B:
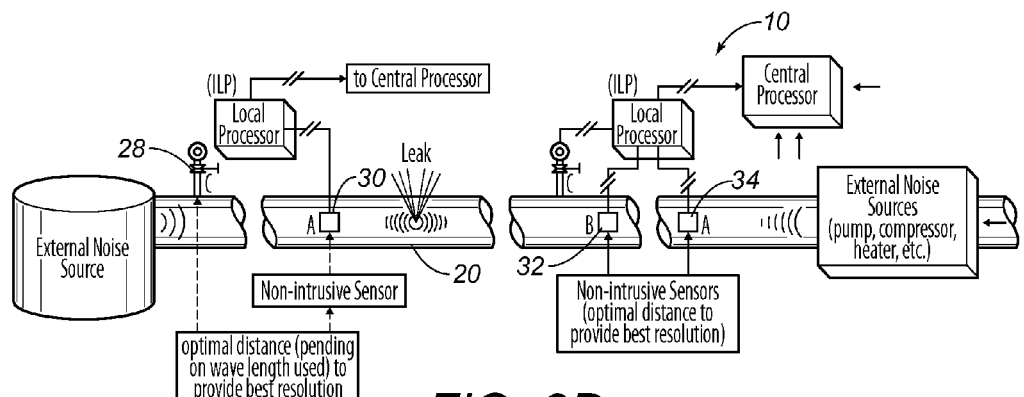
FIG. 2B is a schematic view showing a second configuration of the alternative embodiment of the system of the present invention wherein a single non-intrusive sensor is substituted for one of the pairs of non-intrusive sensors.

Referring to FIGS. 2A and 2B, alternate configurations of the system 10 of the present invention are shown. In FIGS. 2A and 2B, a pair of sensors 32 and 34 are used to gather acoustic pressure wave information through the exterior surface of pipe wall to provide independent directional filtering function at the upstream end of the pipeline or branch location. However, at the downstream end of the pipeline 20, only one non-intrusive sensor 30 is used. Intrusive sensor 28 is located a distance from non-intrusive sensor 30. In this case, the signal gathered from the non-intrusive sensor 30 will be used to compare against the signals gathered by the intrusive acoustic sensor 28, with a certain time delay, upstream (FIG. 2A) or downstream (FIG. 2B) of the non-intrusive sensor 28 depending on the nature of background noise, the sensor response frequency, as well as actual installation restriction. A similar algorithm as the one mentioned in the configuration of FIG. 1 will be used to determine the signals source (or direction), which allows for performance of directional filtering. In this configuration, at the end of intrusive and non-intrusive sensor pair, signals gathered at non-intrusive sensor 30 at time t (PAt) are used to compare against signals gathered at intrusive sensor 28 at time t+/−$\Delta$t (PCt+$\Delta$t or PCt−$\Delta$t) where $\Delta$t is the delay time or traveling time of the interesting acoustic signals traveling from sensor 30 to sensor 32 and vice versa. At the other pipe end, where the separate pair of independent non-intrusive sensors 32 and 34 is used, a similar algorithm as mentioned in the description FIG. 1 will be used for leak detection.

Figure 3A:
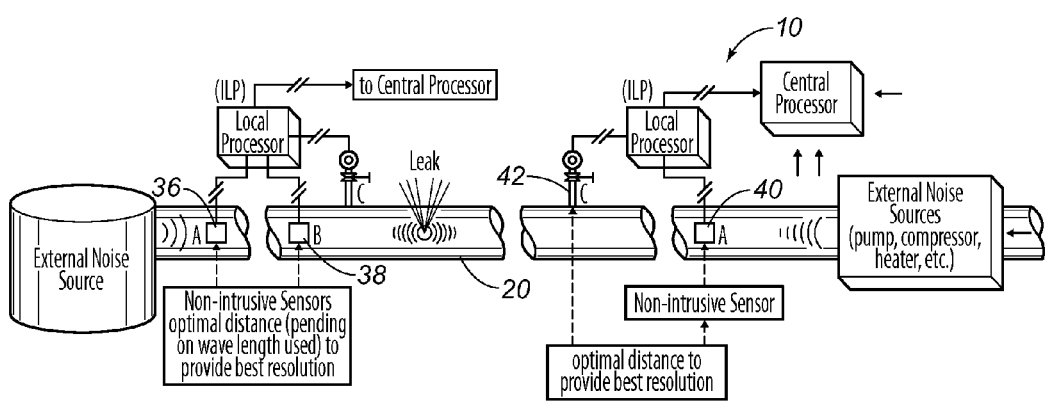
FIG. 3A is a schematic view showing another alternative embodiment of the system of the present invention wherein a single non-intrusive sensor is substituted for one of the pairs of non-intrusive sensors.
Figure 3B:
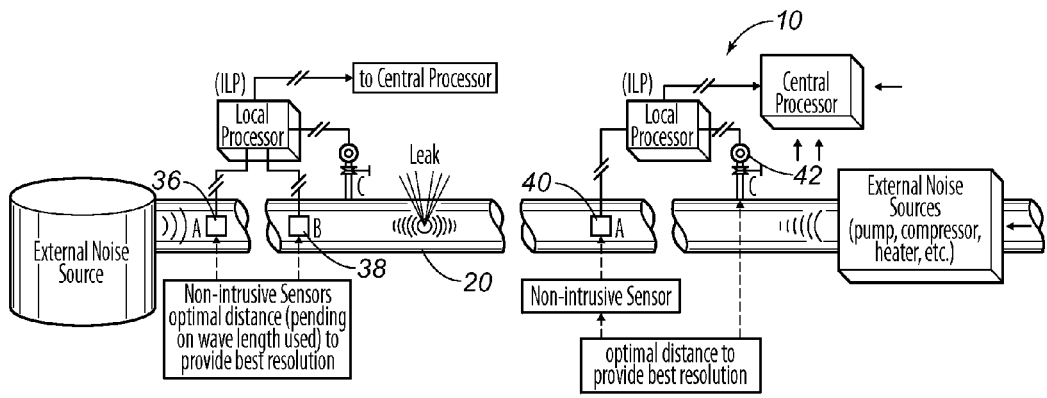
FIG. 3B is a schematic view showing a second configuration of another alternative embodiment of the system of the present invention wherein a single non-intrusive sensor is substituted for one of the pairs of non-intrusive sensors.
Figure 4A:
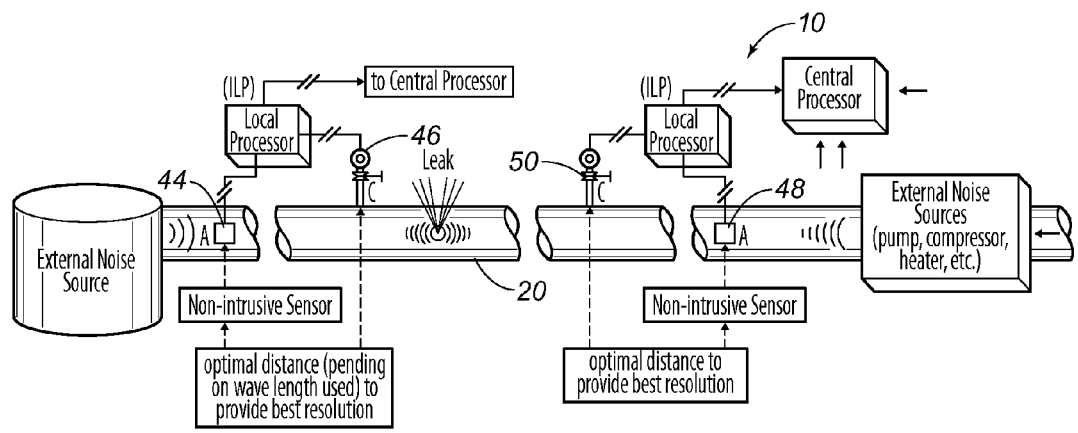
FIG. 4A is a schematic view showing yet another alternative embodiment of the system of the present invention wherein single non-intrusive sensors are substituted for both of the pairs of non-intrusive sensors.
Figure 4B:
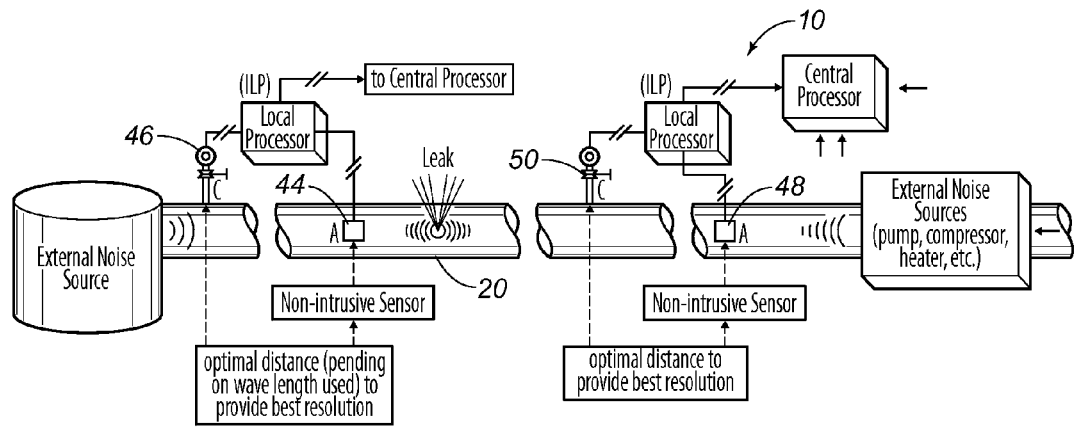
FIG. 4B is a schematic view showing a second configuration of the alternative embodiment of the system of the present invention wherein single non-intrusive sensors are substituted for both of the pairs of non-intrusive sensors different from FIG. 4A.
Figure 4C:
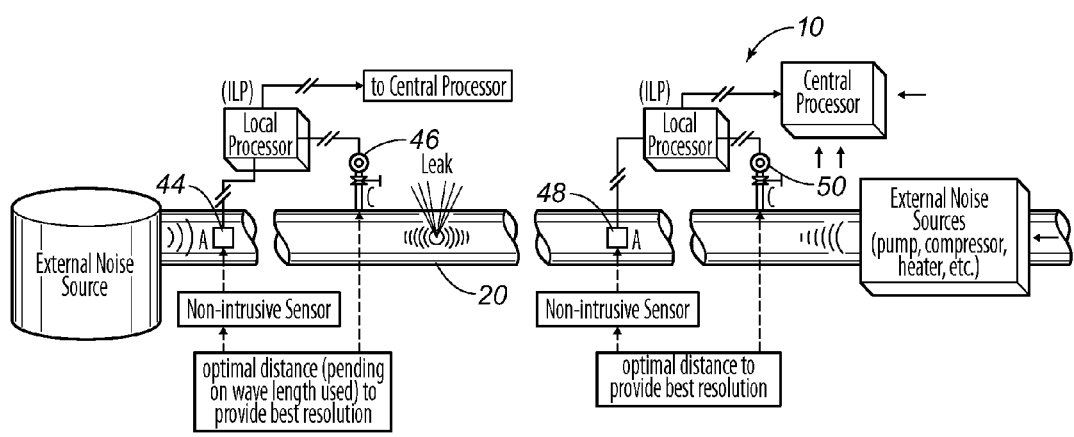
FIG. 4C is a schematic view showing a third configuration of the alternative embodiment of the system of the present invention wherein single non-intrusive sensors are substituted for both of the pairs of non-intrusive sensors different from FIGS. 4A and 4B.
Figure 4D:
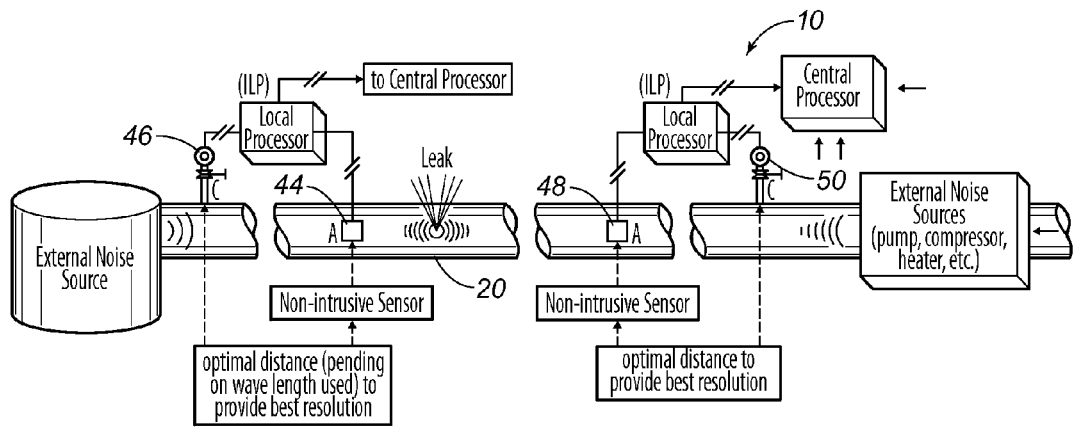
FIG. 4D is a schematic view showing a fourth configuration of the alternative embodiment of the system of the present invention wherein single non-intrusive sensors are substituted for both of the pairs of non-intrusive sensors with upstream/downstream arrangements different from FIGS. 4A, 4B and 4C.

Referring to FIGS. 3A and 3B, another configuration of the system 10 of the present invention is shown. In FIGS. 3A and 3B, a separate pair of non-intrusive sensors 36 and 38 are used to gather acoustic pressure wave information through the exterior surface of pipe wall to provide independent directional filtering function at the downstream end of the pipeline 20 or branch location. However, at the upstream end of the pipeline 20, only one non-intrusive sensor 40 is used. In this case, the signal gathered from the non-intrusive sensor 40 will be used to compare against the signals gathered by the intrusive acoustic sensor 42, with a certain time delay, upstream (FIG. 3B) or downstream (FIG. 3A) of the non-intrusive sensor 40 depending on the nature of background noise, the sensor response frequency, as well as actual installation restriction. A similar algorithm as was described in FIG. 1 will be used to determine the signals source (or direction), which allows for performance of directional filtering. In this configuration, signals gathered at non-intrusive sensor 40 at time t (PAt) are used to compare against signals gathered at intrusive sensor 42 at time t+/−$\Delta$t (PCt+$\Delta$t or PCt−$\Delta$t) where $\Delta$t is the delay time or traveling time of the interesting acoustic signals traveling from sensor 40 to sensor 42 and vice versa. At the other end of the pipeline 20, where a separate pair of independent non-intrusive sensors 36 and 38 is used, a similar algorithm as mentioned in the description FIG. 1 will be used for leak detection.

Referring to FIGS. 4A, 4B, 4C, and 4D, other configurations of the system 10 of the present invention are shown. In these configurations, pairs of non-intrusive sensors are not used. Instead, only one non-intrusive sensor, 44 or 48, is used at each end or branch of the pipeline 20 to gather acoustic pressure wave information through the exterior surface of pipe wall. In this case, the signal gathered from the non-intrusive sensors 44 and 48 will be used to compare against the signals gathered by the intrusive acoustic sensors 46 and 50, respectively, with a certain time delay, upstream or downstream of the non-intrusive sensor depending on the nature of background noise, the sensor response frequency, as well as actual installation restriction. For each pair of intrusive and nonintrusive sensors, a similar algorithm as was mentioned in the description of FIG. 1 will be used to determine the signals source (or direction), which allows for performance of directional filtering. In this configuration, signals gathered at non-intrusive sensor 44 at time t (PAt) are used to compare against signals gathered by the intrusive sensor 46 at time t+/−Δt (PCt+Δt or PCt−Δt) where Δt is the delay time or traveling time of the interesting acoustic signals traveling from sensor 44 to sensor 46 and vice versa. Similarly, signals from non-intrusive sensor 48 are compared with signals from intrusive sensor 50. Similar to what was shown in the various FIGS. 2 and 3, for each pair of intrusive and nonintrusive sensors, the upstream or downstream arrangement between these two sensors can be altered depending on the characteristics of the background noise, the frequency response of the sensors used, the sensor span, installation restriction as well as other factors.

Referring to FIG. 5, there is shown the general installation of the previously described non-intrusive sensors. The non-intrusive sensors 54 can be installed on the surface of the wall of the pipeline 20. In some cases, an array of multiple non-intrusive pressure sensors 54 can be installed at 6, 3, 12 and 9 o'clock positions around the pipe wall to gather signals from different azimuthal directions. These signals can then be used individually or averaged for further data processing. The sensor array may be attached to the pipe wall by cementing each sensor with a specific cement mastic.

FIG. 6 shows one of the possible configurations for the installation of the non-intrusive sensors 54. In this layout, the output from the non-intrusive sensors 54 can be sent to a local processor 56 directly or through a signal conditioner unit 58. Alternatively, the non-intrusive sensors 54 can be connected to signal conditioners 58 which are connected to a 4-20 mA to Modbus signal convertor 60. By using an RF modem and UHF antenna 62, the link between the leak detection system local processor unit 56 mounted inside the plant can be achieved.

Based on the inventor's previously developed patented technology, these new methods and systems are provided to integrate the benefit of highly sensitive, reliable, and accurate leak detection functions from acoustic leak detection systems (ALDS) with the easy installed non-intrusive sensors to provide a high performance on-line real-time integrated leak detection system (ILDS). In the ILDS, advanced non-intrusive sensors (including resistivity strain gauge, fiber optic, piezoelectric strain gauges, and other non-intrusive sensors) that are easily attachable to the exterior wall of any transporting pipeline or pressurized container, are used to provide advanced directional filtering function and to minimize the need for expensive intrusive sensor installation. With the reduced number of intrusive sensors, the previously developed and patented ALDS is used to assure a fast response with sensitive, reliable, and accurate leak detection functions. Various configurations disclosed in the various figures illustrate potential applications of the present invention.

The foregoing disclosure and description of the invention is illustrative and explanatory thereof. Various changes in the details of the described method can be made without departing from the true spirit of the invention. The present invention should only be limited by the following claims and their legal equivalents.

We claim:

1. A system for detecting and locating leaks comprising:
a pipeline;
a plurality of strain sensors positioned along an external surface of said pipeline, said plurality of strain sensors suitable for measuring a strain of the external surface of said pipeline;
a plurality of acoustic pressure sensors positioned at intervals along said pipeline, said plurality of acoustic pressure sensors suitable for sensing an acoustic signal within said pipeline, each of said plurality of strain sensors comprising an array of strain sensors positioned in spaced relation around a circumference of said pipeline, said array of strain sensors comprising:
a first strain sensor positioned at a first position on said circumference of said pipeline;
a second strain sensor positioned at a second position on said circumference of said pipeline;
a third strain sensor positioned at a third position on said circumference of said pipeline; and
a fourth strain sensor positioned at a fourth position on said circumference of said pipeline, said first and second positions being spaced by ninety degrees relative to each other, said third and fourth positions being spaced ninety degrees relative to each other, said first and third positions being spaced by one hundred eighty degrees from each other, said second and fourth positions being spaced by one hundred eighty degrees from each other;
a plurality of local processors positioned at intervals along said pipeline, each of said plurality of local processors being connected to at least one of said plurality of acoustic pressure sensors and/or at least one of said plurality of strain sensors; and
a central processor connected with said plurality of local processors, said central processor suitable for generating an output indicative of a location of a leak in said pipeline.

2. The system of claim 1, said plurality of strain sensors being non-intrusively mounted on said pipeline.

3. The system of claim 1, said plurality of strain sensors being fiber optic sensors.

4. The system of claim 1, said plurality of strain sensors selected from a group consisting of: a piezoelectric strain gauge, a resistance-based metallic strip strain gauge, a capacitive strain gauge, a magnetic strain gauge, a resonant strain gauge, and a piezoresistive strain gauge.

5. A system for detecting and locating leaks comprising:
a pipeline;
a plurality of strain sensors positioned along an external surface of said pipeline, said plurality of strain sensors suitable for measuring a strain of the external surface of said pipeline;
a plurality of acoustic pressure sensors positioned at intervals along said pipeline, said plurality of acoustic pressure sensors suitable for sensing an acoustic signal within said pipeline;
a plurality of local processors positioned at intervals along said pipeline, each of said plurality of local processors being connected to at least one of said plurality of acoustic pressure sensors and/or at least one of said plurality of strain sensors;
a central processor connected with said plurality of local processors, said central processor suitable for generating an output indicative of a location of a leak in said pipeline; and a plurality of signal transmission units connected to each of said plurality of strain sensors, each of said plurality of signal transmission units comprising:
  a signal conditioner connected to at least one strain sensor of said plurality of strain sensors;
  a signal converter connected to said signal conditioner;
  an RF modem connected to said signal converter;
  a first antenna connected to said RF modem; and
  a plurality of second antennae, each of said plurality of second antennae connected to a respective local processor of said plurality of local processors, said plurality of second antennae being suitable for communication with the first antennae of said plurality of signal transmission units.

6. A system for detecting and locating leaks comprising:
a pipeline;
a plurality of strain sensors positioned along an external surface of said pipeline, said plurality of strain sensors suitable for measuring a strain of the external surface of said pipeline;
a plurality of acoustic pressure sensors positioned at intervals along said pipeline, said plurality of acoustic pressure sensors suitable for sensing an acoustic signal within said pipeline;
a plurality of local processors positioned at intervals along said pipeline, each of said plurality of local processors being connected to at least one of said plurality of acoustic pressure sensors and/or at least one of said plurality of strain sensors; and
a central processor connected with said plurality of local processors, said central processor suitable for generating an output indicative of a location of a leak in said pipeline, said plurality of local processors comprising:
  an upstream local processor; and
  a downstream local processor, said upstream local processor being connected with a first strain sensor and with a second strain sensor of said plurality of strain sensors and connected with a first acoustic pressure sensor of said plurality of acoustic pressure sensors, said first acoustic pressure sensor being positioned between said upstream local processor and said downstream local processor, said downstream local processor being connected with a third strain sensor and a fourth strain sensor of said plurality of strain sensors and connected with a second acoustic pressure sensor of said plurality of acoustic pressure sensors, said second acoustic pressure sensor being positioned between said first acoustic pressure sensor and said downstream local processor.

7. A system for detecting and locating leaks comprising:
a pipeline;
a plurality of strain sensors positioned along an external surface of said pipeline, said plurality of strain sensors suitable for measuring a strain of the external surface of said pipeline;
a plurality of acoustic pressure sensors positioned at intervals along said pipeline, said plurality of acoustic pressure sensors suitable for sensing an acoustic signal within said pipeline;
a plurality of local processors positioned at intervals along said pipeline, each of said plurality of local processors being connected to at least one of said plurality of acoustic pressure sensors and/or at least one of said plurality of strain sensors;
a central processor connected with said plurality of local processors, said central processor suitable for generating an output indicative of a location of a leak in said pipeline, said plurality of local processors comprising:
  an upstream local processor; and
  a downstream local processor, said upstream local processor being connected with a first strain sensor of said plurality of strain sensors and connected with a first acoustic pressure sensor of said plurality of acoustic pressure sensors, said first acoustic pressure sensor being positioned between said upstream local processor and said downstream local processor, said downstream local processor being connected with a second strain sensor and a third strain sensor of said plurality of strain sensors and connected with a second acoustic pressure sensor of said plurality of acoustic pressure sensors, said second acoustic pressure sensor being positioned between said first acoustic pressure sensor and said downstream local processor.

8. A system for detecting and locating leaks comprising:
a pipeline;
a plurality of strain sensors positioned along an external surface of said pipeline, said plurality of strain sensors suitable for measuring a strain of the external surface of said pipeline;
a plurality of acoustic pressure sensors positioned at intervals along said pipeline, said plurality of acoustic pressure sensors suitable for sensing an acoustic signal within said pipeline;
a plurality of local processors positioned at intervals along said pipeline, each of said plurality of local processors being connected to at least one of said plurality of acoustic pressure sensors and/or at least one of said plurality of strain sensors;
a central processor connected with said plurality of local processors, said central processor suitable for generating an output indicative of a location of a leak in said pipeline, said plurality of local processors comprising:
  an upstream local processor; and
  a downstream local processor, said upstream local processor being connected with a first strain sensor of said plurality of strain sensors and connected with a first acoustic pressure sensor of said plurality of acoustic pressure sensors, said first acoustic pressure sensor being positioned on a side of said first strain sensor opposite said downstream local processor, said downstream local processor being connected with a second strain sensor and a third strain sensor of said plurality of strain sensors and connected with a second acoustic pressure sensor of said plurality of acoustic pressure sensors, said second acoustic pressure sensor being positioned between said first strain sensor and said downstream local processor.

9. A system for detecting and locating leaks comprising:
a pipeline;
a plurality of strain sensors positioned along an external surface of said pipeline, said plurality of strain sensors suitable for measuring a strain of the external surface of said pipeline;
a plurality of acoustic pressure sensors positioned at intervals along said pipeline, said plurality of acoustic pressure sensors suitable for sensing an acoustic signal within said pipeline;
a plurality of local processors positioned at intervals along said pipeline, each of said plurality of local processors being connected to at least one of said plurality of acoustic pressure sensors and/or at least one of said plurality of strain sensors;

a central processor connected with said plurality of local processors, said central processor suitable for generating an output indicative of a location of a leak in said pipeline, said plurality of local processors comprising:
  an upstream local processor; and
  a downstream local processor, said upstream local processor being connected with a first strain sensor and with a second strain sensor of said plurality of strain sensors and connected with a first acoustic pressure sensor of said plurality of acoustic pressure sensors, said first acoustic pressure sensor being positioned between said upstream local processor and said downstream local processor, said downstream local processor being connected with a third strain sensor of said plurality of strain sensors and connected with a second acoustic pressure sensor of said plurality of acoustic pressure sensors, said second acoustic pressure sensor being positioned between said first acoustic pressure sensor and said downstream local processor.

10. A system for detecting and locating leaks comprising:
a pipeline;
a plurality of strain sensors positioned along an external surface of said pipeline, said plurality of strain sensors suitable for measuring a strain of the external surface of said pipeline;
a plurality of acoustic pressure sensors positioned at intervals along said pipeline, said plurality of acoustic pressure sensors suitable for sensing an acoustic signal within said pipeline;
a plurality of local processors positioned at intervals along said pipeline, each of said plurality of local processors being connected to at least one of said plurality of acoustic pressure sensors and/or at least one of said plurality of strain sensors; and
a central processor connected with said plurality of local processors, said central processor suitable for generating an output indicative of a location of a leak in said pipeline, said plurality of local processors comprising:
  an upstream local processor; and
  a downstream local processor, said upstream local processor being connected with a first strain sensor and with a second strain sensor of said plurality of strain sensors and connected with a first acoustic pressure sensor of said plurality of acoustic pressure sensors, said first acoustic pressure sensor being positioned between said upstream local processor and said downstream local processor, said downstream local processor being connected with a third strain sensor of said plurality of strain sensors and connected with a second acoustic pressure sensor of said plurality of acoustic pressure sensors, said second acoustic pressure sensor being positioned on a side of said third strain sensor opposite said first acoustic pressure sensor.

11. A system for detecting and locating leaks comprising:
a pipeline;
a plurality of strain sensors positioned along an external surface of said pipeline, said plurality of strain sensors suitable for measuring a strain of the external surface of said pipeline;
a plurality of acoustic pressure sensors positioned at intervals along said pipeline, said plurality of acoustic pressure sensors suitable for sensing an acoustic signal within said pipeline;
a plurality of local processors positioned at intervals along said pipeline, each of said plurality of local processors being connected to at least one of said plurality of acoustic pressure sensors and/or at least one of said plurality of strain sensors; and
a central processor connected with said plurality of local processors, said central processor suitable for generating an output indicative of a location of a leak in said pipeline, said plurality of local processors comprising:
  an upstream local processor; and
  a downstream local processor, said upstream local processor being connected with a first strain sensor of said plurality of strain sensors and connected with a first acoustic pressure sensor of said plurality of acoustic pressure sensors, said first acoustic pressure sensor being positioned between said upstream local processor and said downstream local processor, said downstream local processor being connected with a second strain sensor of said plurality of strain sensors and connected with a second acoustic pressure sensor of said plurality of acoustic pressure sensors, said second acoustic pressure sensor being positioned between said first acoustic pressure sensor and said second strain sensor.

12. A system for detecting and locating leaks comprising:
a pipeline;
a plurality of strain sensors positioned along an external surface of said pipeline, said plurality of strain sensors suitable for measuring a strain of the external surface of said pipeline;
a plurality of acoustic pressure sensors positioned at intervals along said pipeline, said plurality of acoustic pressure sensors suitable for sensing an acoustic signal within said pipeline;
a plurality of local processors positioned at intervals along said pipeline, each of said plurality of local processors being connected to at least one of said plurality of acoustic pressure sensors and/or at least one of said plurality of strain sensors; and
a central processor connected with said plurality of local processors, said central processor suitable for generating an output indicative of a location of a leak in said pipeline, said plurality of local processors comprising:
  an upstream local processor; and
  a downstream local processor, said upstream local processor being connected with a first strain sensor of said plurality of strain sensors and connected with a first acoustic pressure sensor of said plurality of acoustic pressure sensors, said first acoustic pressure sensor being positioned between on a side of said first strain sensor opposite said downstream local processor, said downstream local processor being connected with a strain strain sensor of said plurality of strain sensors and connected with a second acoustic pressure sensor of said plurality of acoustic pressure sensors, said second acoustic pressure sensor being positioned between said first strain sensor and said second strain sensor.

13. A system for detecting and locating leaks comprising:
a pipeline;
a plurality of strain sensors positioned along an external surface of said pipeline, said plurality of strain sensors suitable for measuring a strain of the external surface of said pipeline;
a plurality of acoustic pressure sensors positioned at intervals along said pipeline, said plurality of acoustic pressure sensors suitable for sensing an acoustic signal within said pipeline;

a plurality of local processors positioned at intervals along said pipeline, each of said plurality of local processors being connected to at least one of said plurality of acoustic pressure sensors and/or at least one of said plurality of strain sensors; and a central processor connected with said plurality of local processors, said central processor suitable for generating an output indicative of a location of a leak in said pipeline, said plurality of local processors comprising:

an upstream local processor; and a downstream local processor, said upstream local processor being connected with a first strain sensor of said plurality of strain sensors and connected with a first acoustic pressure sensor of said plurality of acoustic pressure sensors, said first acoustic pressure sensor being positioned between said upstream local processor and said downstream local processor, said downstream local processor being connected with a second strain sensor of said plurality of strain sensors and connected with a second acoustic pressure sensor of said plurality of acoustic pressure sensors, said second acoustic pressure sensor being positioned on a side of said second strain sensor opposite said upstream local processor.

14. A system for detecting and locating leaks comprising:

a pipeline;

a plurality of strain sensors positioned along an external surface of said pipeline, said plurality of strain sensors suitable for measuring a strain of the external surface of said pipeline;

a plurality of acoustic pressure sensors positioned at intervals along said pipeline, said plurality of acoustic pressure sensors suitable for sensing an acoustic signal within said pipeline;

a plurality of local processors positioned at intervals along said pipeline, each of said plurality of local processors being connected to at least one of said plurality of acoustic pressure sensors and/or at least one of said plurality of strain sensors; and a central processor connected with said plurality of local processors, said central processor suitable for generating an output indicative of a location of a leak in said pipeline, said plurality of local processors comprising:

an upstream local processor; and a downstream local processor, said upstream local processor being connected with a first strain sensor of said plurality of strain sensors and connected with a first acoustic pressure sensor of said plurality of acoustic pressure sensors, said first acoustic pressure sensor being positioned on a side of said first strain sensor opposite said downstream local processor, said downstream local processor being connected with a second strain sensor of said plurality of strain sensors and connected with a second acoustic pressure sensor of said plurality of acoustic pressure sensors, said second acoustic pressure sensor being positioned on a side of said second strain sensor opposite said upstream local processor.

15. A method of detecting leaks in a pipeline comprising the steps of:

mounting a plurality of acoustic pressure sensors at intervals along the pipeline, said acoustic pressure sensors suitable for sensing an acoustic signal within the pipeline;

mounting a plurality of strain sensors at intervals along the pipeline, said plurality of strain sensors suitable for measuring a strain on an external surface of the pipeline;

mounting a plurality a plurality of local processors at intervals along the pipeline, each of said plurality of local processors being connected to at least one of said plurality of acoustic pressure sensors and/or at least one of said plurality of strain sensors;

transmitting a sensed acoustic signal from an acoustic pressure sensor of said plurality of acoustic pressure sensors to a local processor of said plurality of local processors;

comparing said sensed acoustic signal to stored data to determine whether a leak has occurred;

transmitting a sensed strain measurement from a strain sensor of said plurality of strain sensors to a local processor of said plurality of local processors;

comparing said sensed strain measurement to stored strain data to determine whether a leak has occurred; and comparing said sensed strain measurement to said sensed acoustic signal to validate a detected leak.

16. The method of claim 15, said plurality of strain sensors being non-intrusively mounted on the pipeline.

17. The method of claim 15, said plurality of strain sensors being mounted on the pipeline in close proximity to known noise sources such as pumps and valves.

18. A method of non-intrusively detecting leaks in a pipeline comprising the steps of:

mounting a plurality of strain sensors at intervals along the pipeline, said plurality of strain sensors suitable for measuring a strain on an external surface of the pipeline, said plurality of strain sensors being non-intrusively mounted on the pipeline;

mounting a plurality a plurality of local processors at intervals along the pipeline, each of said plurality of local processors being connected to at least one of said plurality of strain sensors;

transmitting a sensed strain measurement from a strain sensor of said plurality of strain sensors to a local processor of said plurality of local processors; and comparing said sensed strain measurement to stored strain data to determine whether a leak has occurred, said stored strain data including strain data profiles for common noise sources.

* * * * *